Figure 1:
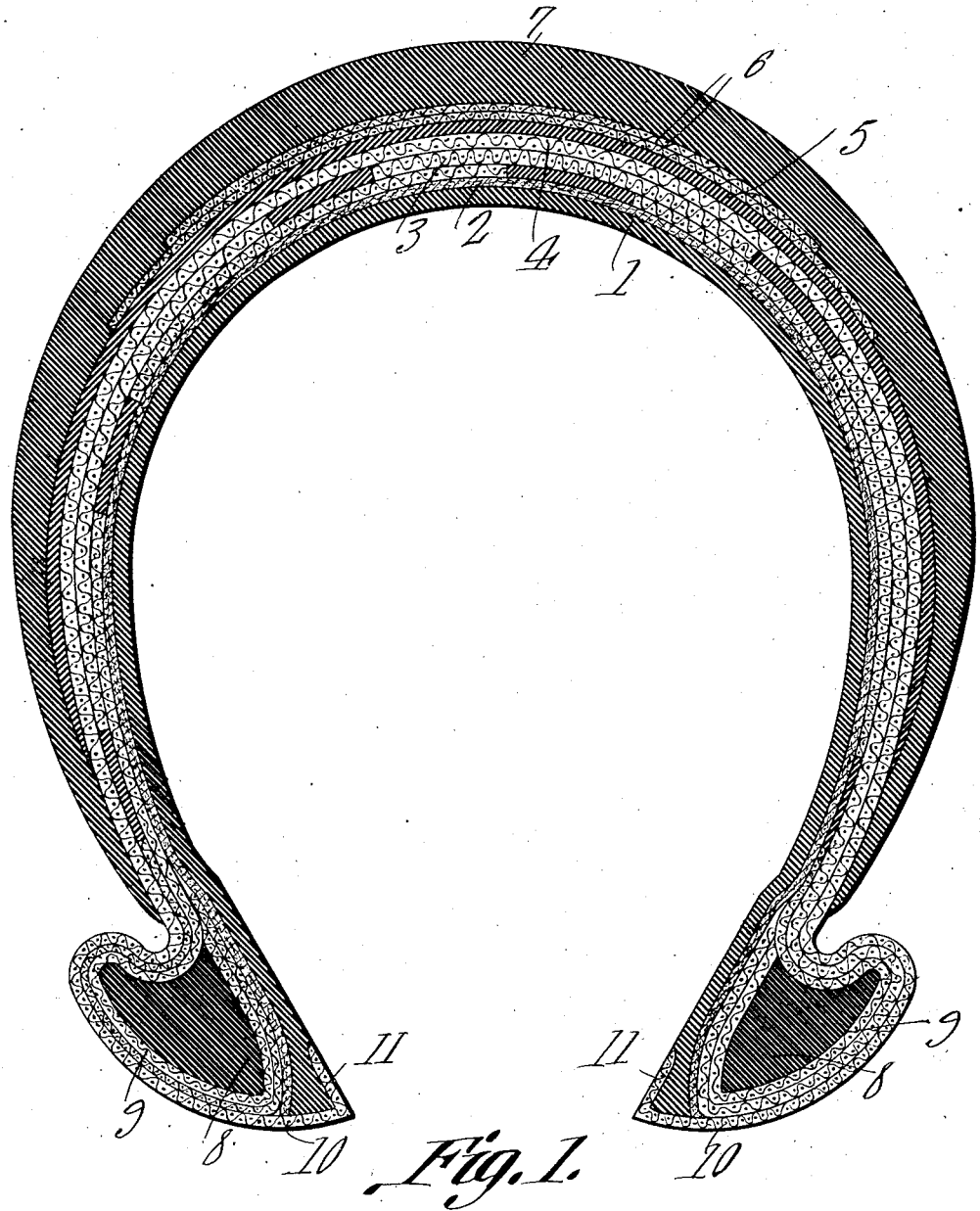

F. W. KREMER.
PNEUMATIC AUTO TIRE.
APPLICATION FILED APR. 21, 1911.

1,257,251.

Patented Feb. 19, 1918.
2 SHEETS—SHEET 2.

Witnesses

F. W. Kremer, Inventor
by C. A. Snow & Co.
Attorneys

UNITED STATES PATENT OFFICE.

FRANKLIN W. KREMER, OF RUTHERFORD, NEW JERSEY.

PNEUMATIC AUTO-TIRE.

1,257,251.    Specification of Letters Patent.    Patented Feb. 19, 1918.

Application filed April 21, 1911. Serial No. 622,506.

*To all whom it may concern:*

Be it known that I, FRANKLIN W. KREMER, a citizen of the United States, residing at Rutherford, in the county of Bergen and State of New Jersey, have invented a new and useful Pneumatic Auto-Tire, of which the following is a specification.

By way of explanation, I will state that multiply vehicle tires are commonly fashioned upon a circular core, certain of the layers of the tire being stretched around the core, the stretching tension being applied circumferentially of the core. This operation stretches these layers along their longitudinal centers, the edges of these layers, however remaining relatively slack. The result of this method of procedure is that in the finished tire, there is a lack of uniformity in the stretch of the material. The tire, therefore, is relatively strong at one point, and relatively weak at other points.

It is one object of the present invention to remedy the above mentioned, undesirable features, by introducing into the tire structure, a plurality of crossed, reinforcing strips, whereby, after the constituent material of the tire has been stretched tightly, circumferentially of the core, the material may likewise be stretched tightly, transversely of the core. A further object of the invention is to provide a vehicle tire, in which the heat, generated by friction adjacent the periphery of the tire, will be prevented from penetrating into the interior of the tire, the heating of the contained air of the tire obviously causing the same to expand, whereby blow-outs frequently are occasioned. A further object of the invention is to strengthen generally, devices of this class, and to provide novel means for assembling the constituent elements of a multiply tire.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—

Figure 2:
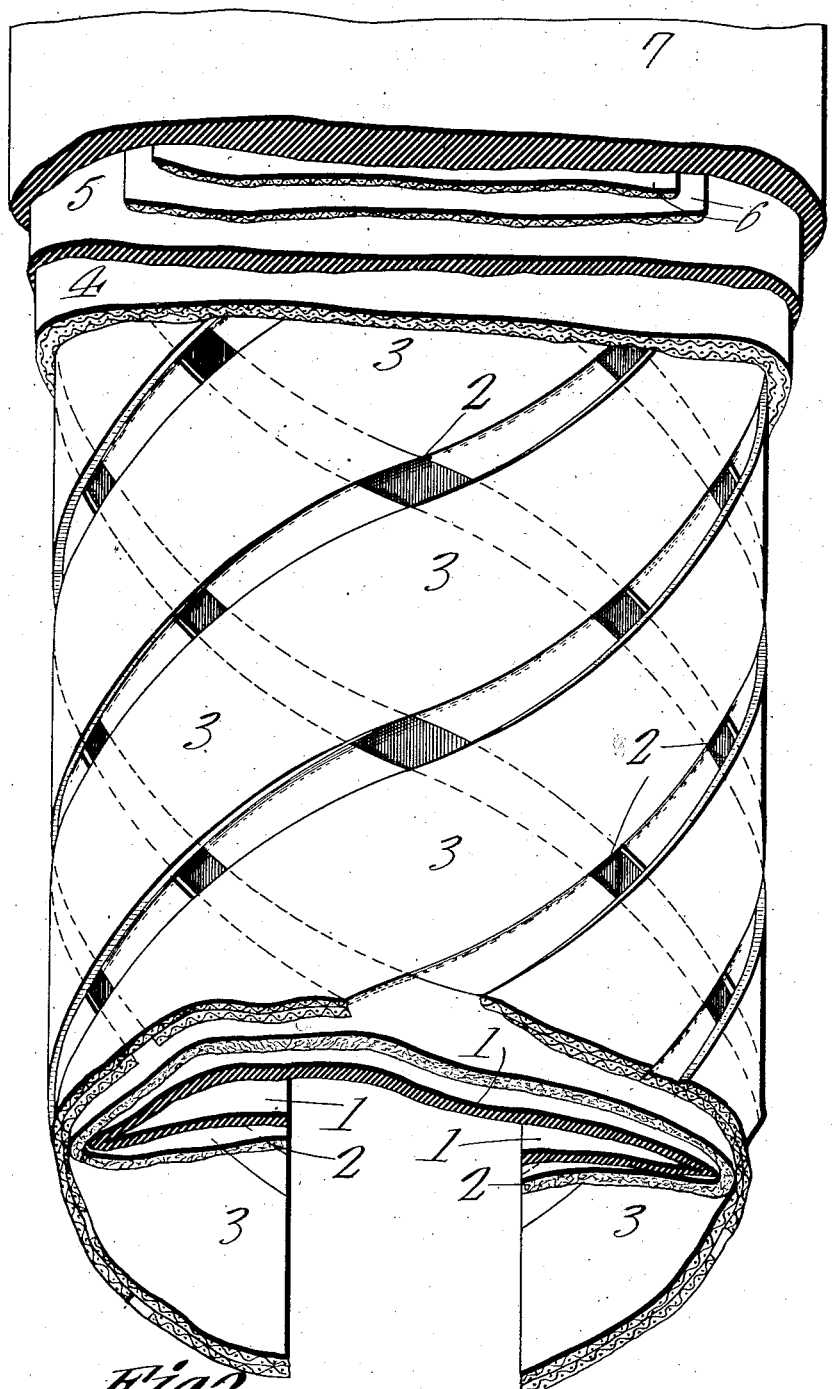

Figure 1 shows the invention in transverse section; and Fig. 2 is a top plan, successive layers of the tire being broken away.

In carrying out the invention, there is provided a lining 1, preferably fashioned from rubber. Superposed upon the lining 1 is a strip 2 of refractory material, preferably asbestos. Superposed upon the layer of asbestos, are crossed reinforcing strips 3, ordinarily of canvas or other textile material. These reinforcing strips 3 extend around the tire transversely, at an acute angle to the axis of the tire.

Superposed upon the reinforcing strips 3 is the body member 4 of the tire, the same being preferably canvas. Upon the body member 4 is the cushion portion 5 of the tire, the same being ordinarily rubber. Beyond the cushion 5 are the breaker strips 6, extended circumferentially of the tire, these breaker strips being commonly made of canvas or other textile material. The outer member of the tire is represented by the tread 7, the same being preferably of rubber.

Extended along the sides of the tire, are ribs 8, the same being generally made of rubber. As shown at 9 the ends of the crossed reinforcing strips 3, are passed around and engaged with the ribs 8. The tread 7 and the cushion 5 preferably terminate slightly above the ribs 8, the edges 10 of the body member 4 being carried around the ribs 8 and around the ends of the reinforcing strips 3, the extreme edge portions of the body member 4 being, when desired, overlapped slightly upon the inner face of the lining 1, as shown at 11.

It will of course be understood that in the process of manufacture, all of the several elements hereinbefore referred to, are tightly secured together, so that the tire, as an entity, is a solid, compact structure.

It will be seen that, owing to the presence of the reinforcing strips 3, the tire will have an even and equal tension throughout, all portions of the tire being of equal strength, and of equal efficiency in repelling punctures and wear.

The inner, rubber lining 1, renders the tire hermetic, and owing to the presence of the refractory asbestos strip 2, betwene the constituent layers of the tire, a heating of the interior of the tire, due to the friction generated at the tread, will be avoided.

As will be clearly understood by those skilled in the art, the construction of the device is such that ruptures in the fabric of the tire, during the process of manufacture, will be avoided, the reinforcing strips 3 giving a trussed construction to the tire.

Having thus described the invention, what is claimed is:—

1. A tire comprising a lining, ribs extending along the edges of said lining, reinforcing strips upon said lining and passing between the lining and the ribs and extending across the tire from side to side in reversely curved parallel lines, and a body member placed upon the strips and extending over the ribs, and having its edges overlapping the edges of the lining.

2. A tire comprising a lining, a tread, a layer of non-combustible material between the tread and the lining, and reinforcing strips between the tread and said layer and extending from side to side of the tire in reversely curved parallel lines to prevent rupture of said layer.

In testimony that I claim the foregoing as my own, I have hereto affixed my signature in the presence of two witnesses.

FRANKLIN W. KREMER.

Witnesses:
 FRANK DE WITT,
 J. A. MILLER.